Figure 1:
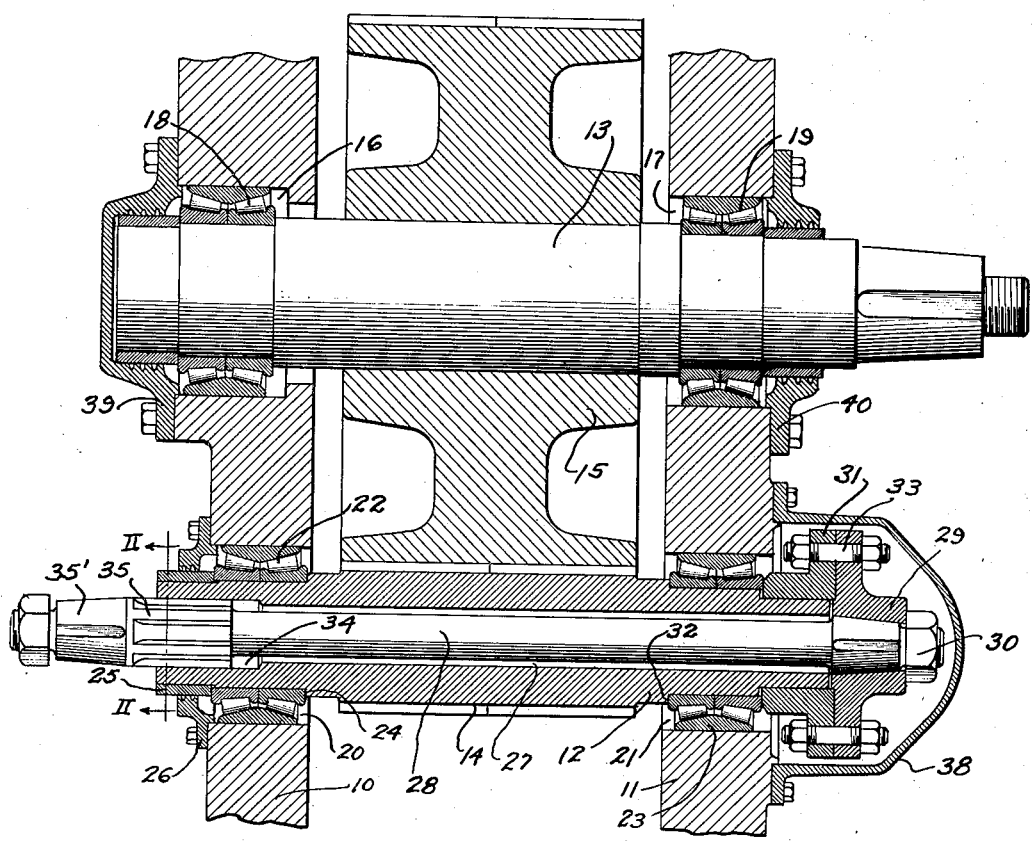

Oct. 11, 1938.　　　A. KUHNS　　　2,133,102
DRIVE CONNECTION
Filed June 26, 1937

Inventor
AUSTIN KUHNS.
by Charles H. Hills Attys.

Patented Oct. 11, 1938

2,133,102

UNITED STATES PATENT OFFICE 2,133,102

DRIVE CONNECTION

Austin Kuhns, Buffalo, N. Y., assignor to Farrel-Birmingham Company, Incorporated, Buffalo, N. Y., a corporation of Connecticut Application June 26, 1937, Serial No. 150,460

4 Claims. (Cl. 74—413)

My invention relates to improved driving connection for resiliently connecting a driving element with an element to be driven so as to prevent the introduction of critical or torsional vibrations from the driving element and the driven element, as for example in marine propulsion where a driving source, such as a Diesel engine, drives the propeller shaft and where the introduction of any torsional vibration of the engine and the propeller shaft should be avoided.

An important object of the invention is to obtain the resilient driving torque by means of a torsion shaft connected at one end with the driving source and coupled at its other end to a driving train which connects with the member to be driven. In marine propulsion the torsion shaft would be connected at one end with the driving engine and at its other end with a driving pinion meshing with a driving gear on the propeller shaft, and, in order to afford a compact arrangement, the torsion shaft could be located in the bore of the shaft which mounts the driving pinion.

Another important object of the invention is to limit the torsional displacement of the torsion shaft in order to relieve it from excess strain during excessive or overload conditions, as for example during starting of the drive, or during reversal of rotation of the propeller, or in case of a broken propeller, or other conditions which might throw excessive load on the torsion shaft, the arrangement being such that during ordinary load conditions the drive shaft will elastically and torsionally transmit power from the driving source to the driven element, but under excess load conditions the torsion displacement of the drive shaft will be limited and the drive shaft connected for direct driving until normal load conditions are resumed.

Figure 2:
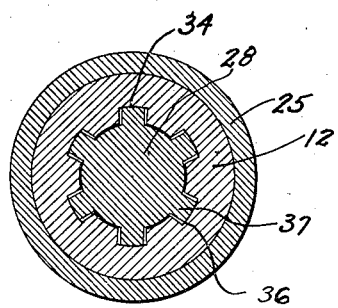

The features of my invention are incorporated in the structure shown on the drawing, in which:

Figure 1 is a horizontal diametral section through the driving shaft structure and the driven shaft structure and driving transmission parts; and Figure 2 is an enlarged section on plane II—II of Figure 1.

The arrangement shown is that which might efficiently be used in marine propulsion where the propeller shaft is driven by a driving source such as a Diesel engine. As shown, the supporting framework for the driving transmission provides two opposed walls 10 and 11 between which extend the drive pinion shaft 12 and the propeller shaft 13, the drive shaft mounting the drive pinion 14 which may be integral with the shaft, and the propeller shaft mounting the gear 15 meshing with the pinion.

The openings 16 and 17 in the walls 10 and 11 house suitable anti-friction bearing structures 18 and 19 respectively for the propeller shaft whose right end, in the arrangement shown, is adapted for connection with suitable coupling means (not shown) for connecting the shaft with a propeller (not shown). The bearing structure 18, instead of being an ordinary bearing as shown, could be a suitable thrust bearing for taking up the end thrust of the propeller shaft.

The openings 20 and 21 in the walls 10 and 11 house suitable anti-friction bearing assemblies 22 and 23 for the respective ends of the drive pinion shaft 12. The inner rings of the bearing assembly 22 are secured on the shaft 12 between the shoulder 24 and a collar 25 secured on the outer end of the shaft, the cover structure 26 closing the outer end of the opening 20.

The pinion shaft 12 has the bore 27 extending full length therethrough for receiving the torsion drive shaft 28. At its inner end the drive shaft 28 is keyed and secured to an outer coupling member 29. As shown, the shaft end is frusto-conical to engage a correspondingly shaped recess in the coupling member to be secured thereto against rotation, a nut 30 engaging the threaded end of the shaft for clamping it securely to the coupling member against axial displacement. A companion coupling member 31 receives the reduced inner end of the pinion shaft 12, and between this coupling member and the shoulder 32 on the pinion shaft the inner rings of the anti-friction bearing structure 23 are clamped, the coupling member 31 being detachably secured to the outer coupling member 29 as by means of bolts 33.

At the outer end of the pinion shaft 12, the shaft bore is of enlarged diameter to provide the cylindrical bearing recess 34 for the head 35 at the outer end of the drive shaft, the outer end 35' of the head being frusto-conical for receiving and being keyed to suitable coupling means for coupling the drive shaft to a driving source such as a Diesel engine (not shown). Where clutch means, such as a hydraulic clutch or coupling, is interposed between the driving source and the drive shaft, the shaft end would be connected with the rotor or driven element of the hydraulic clutch.

With the outer end of the shaft 28 journalled in the bearing recess 34, and its inner end secured to the inner end of the pinion shaft by the coupling structure 29–31, the driving shaft is coaxial with the pinion shaft and is free to torsion so as to elastically or resiliently transmit the rotation torque from the driving source to the driving pinion shaft through the coupling assembly 29–31, so that power is transmitted yieldably and resiliently from the driving pinion to the gear and the shaft to be driven, and during normal running condition any torsional vibrations set up in the driving source will be absorbed by the torsion shaft and the transmission of such vibrations to the driven shaft avoided, so that the driven shaft will rotate smoothly and uniformly.

Under starting, or overload, and during reversal of rotation direction, extreme torque would be applied to the torsion shaft, and I therefore provide means for protecting the torsion shaft against breakage or torsion or twist beyond its elastic limit. I provide a spline connection between the drive shaft head 35 and the pinion shaft 12, the pinion shaft within the bearing recess 34 having the longitudinally extending channels 36 for receiving the splines or teeth 37 on the head 35. The outer surfaces of the splines 37 maintain their bearing engagement with the bottoms of the channels 36 so as to hold the drive shaft in axial alignment in the pinion shaft bore, but the circumferential width of the splines 37 is less than that of the channels 36 so as to leave clearance space for free torsion movement of the shaft 28 relative to the pinion shaft, the splines being suitably spaced from the opposite sides of the channels when the driving shaft is at rest. The clearance space between the splines and the channel sides is such that, under the application of excessive torque to the drive shaft in either direction, the splines will engage with the corresponding sides of the channels for direct drive connection between the drive shaft and the pinion shaft before the drive shaft torsion reaches the elastic limit, breakage or distortion of the drive shaft being thus prevented. As soon as the extreme torque conditions have been overcome and normal driving conditions are established, the drive from the driving source to the driven element will be resilient by the torsioning movement of the drive shaft. In marine propulsion systems the double helical or herringbone type of gearing is preferable on account of its efficient and noiseless operation, and to maintain such efficient and noiseless operation the driving pinions must always freely mesh with the driven gear. The propeller shaft is usually provided with thrust bearings which tend to prevent axial displacement or oscillation of the shaft, but there is more or less of such axial movement, particularly when the direction of rotation of the propeller is changed. In the openings 20 and 21, in which the roller bearing assemblies 22 and 23 are housed, the outer bearing rings are not restrained against axial movement, and the entire driving pinion and drive shaft assembly are therefore free for axial movement so that the drive pinion may follow any axial movement of the propeller shaft 13 and the gear 15 so as to maintain free meshing engagement of the gear teeth and to prevent friction and wear thereof.

The inner ends of the pinion shaft and drive shaft assembly may be protected by a cap structure 38 secured to the wall 11, and the outer ends of the pockets 16 and 17 for the ball bearing structures 18 and 19 for the propeller shaft may be closed by cap structures 39 and 40.

I do not desire to be limited to the exact construction, arrangement, and operation shown and described, as changes and modifications may be made without departing from the spirit and scope of the invention.

I claim as follows:

1. In a driving connection of the class described, a driving shaft having an axial bore therethrough, means journalling said shaft, a transmission shaft extending through the bore of the drive shaft and journalled therein, said transmission shaft at its inner end being rigidly connected with the driving shaft, the outer end of said shaft extending beyond said driving shaft and being adapted for connection with a driving source, the outer end of said shaft within said driving shaft bore having spline connection with said driving shaft and with clearance space provided in the spline connection for permitting limited torsional movement of said transmission shaft independently of said driving shaft for resiliently transmitting the torque from the driving source to said driving shaft, the clearance space at the spline connection being such that the transmission shaft will have direct driving connection with said driving shaft under extreme torque application to the transmission shaft by the driving source.

2. In a driving connection of the class described, a driving shaft having an axial bore, means journalling said driving shaft, a transmission shaft extending into said bore, means coupling the inner end of said transmission shaft to said driving shaft, said transmission shaft having a head at its outer end bearing in said bore, the outer end of said transmission shaft beyond said head being adapted for connection with a driving source, said transmission shaft outwardly from its coupling connection with the driving shaft being free for torsional movement independently of said driving shaft whereby to resiliently transmit the driving torque from the source to the driving shaft, and cooperating means on the transmission shaft head and the driving shaft for establishing direct driving engagement between the transmission shaft and driving shaft when the driving torque by said source becomes excessive.

3. In a drive connection of the class described, a driving shaft having an axially extending bore, means journalling said driving shaft, a transmission shaft extending in said bore and secured at its inner end to the driving shaft, the outer end of said shaft being adapted for connection with a driving source, said transmission shaft outwardly from its connection with said driving shaft being free to torsion independently of said driving shaft whereby to resiliently transmit the driving torque of the source to said driving shaft, and cooperable abutments on said shafts normally disengaged from each other to permit such independent torsioning of the transmission shaft but engaging for direct driving connection between the transmission shaft and driving shaft to prevent abnormal torsioning of said transmission shaft.

4. In a driving connection of the class described, a pinion and supporting shaft therefor having an axially extending bore, means journalling said pinion shaft, a driven shaft and a gear thereon meshing with said pinion, a torque shaft extending through said bore and coupled at its inner end to the pinion shaft, the outer end of said shaft being adapted for connection with a driving source, said torque shaft outwardly from its connection with the pinion shaft being free to torsion under the application of torque thereto by the driving source and independently of said pinion shaft, whereby to resiliently rotate the pinion shaft, and means for limiting the torsioning of said torque shaft and for establishing a direct driving connection between its outer end and the pinion shaft under abnormal torque conditions.

AUSTIN KUHNS.